United States Patent [19]

Saunders et al.

[11] Patent Number: 5,283,828
[45] Date of Patent: Feb. 1, 1994

[54] ARCHITECTURE FOR UTILIZING COPROCESSING SYSTEMS TO INCREASE PERFORMANCE IN SECURITY ADAPTED COMPUTER SYSTEMS

[75] Inventors: Randy Saunders, Upland; Emmanuel C. Francisco, Covina, both of Calif.

[73] Assignee: Hughes Training, Inc., Arlington, Tex.

[21] Appl. No.: 20,878

[22] Filed: Feb. 19, 1993

Related U.S. Application Data

[63] Continuation of Ser. No. 662,658, Mar. 1, 1991, abandoned.

[51] Int. Cl.⁵ .............................................. H04L 9/00
[52] U.S. Cl. ......................................... 380/4; 380/23; 380/25; 380/49; 380/50
[58] Field of Search ................... 380/4, 23, 25, 49, 50; 340/825.31, 825.34

[56] References Cited

U.S. PATENT DOCUMENTS

| | | | |
|---|---|---|---|
| 4,203,166 | 5/1980 | Ehrsam et al. | 380/49 X |
| 4,493,028 | 1/1985 | Heath | 380/49 X |
| 4,531,023 | 7/1985 | Levine | 380/23 X |
| 4,876,717 | 10/1989 | Barron et al. | 380/25 |
| 4,882,752 | 11/1989 | Lindman et al. | 380/25 |

*Primary Examiner*—Bernarr E. Gregory
*Attorney, Agent, or Firm*—Wanda K. Denson-Low

[57] ABSTRACT

A security system adapted for use with a base computer 29 includes a security computer 31 for reading and writing data from memory in the base computer system 29, for transferring data to and from an encryption system 3, for transferring encrypted data to and from a storage system 14, and for interfacing with a trusted path interface device 22. The security system includes a system for regulating, and for interrupting or delaying, operation of the base computer in response to signals from means for associating, with each data group within the security system, data specifying an individual user.

6 Claims, 5 Drawing Sheets

ARCHITECTURE FOR UTILIZING COPROCESSING SYSTEMS TO INCREASE PERFORMANCE IN SECURITY ADAPTED COMPUTER SYSTEMS

This is a continuation of U.S. application Ser. No. 07/662,658 filed Mar. 1, 1991, now abandoned.

FIELD OF THE INVENTION

This invention relates to security systems that are adapted for use with conventional computer systems such as the IBM PC/AT compatible systems and that provide a high level of security for the user. More specifically, this invention relates to improvements in computer security by adding certain hardware and software to obtain a secure computer system.

DESCRIPTION OF RELATED ART

Before now, computer systems requiring security for the data used in a computer had to be placed inside a locked room, requiring a user to leave his office and isolate himself inside the room, thus decreasing his productivity. Alternatively, special secure processors used control software to secure data and programs. These processors suffered severe performance degradation, increasing costs and decreasing usage of such systems.

A need has developed for a computer security system that need not be locked in a separate room, which provides equivalent performance and improved user productivity.

Typical computer system architectures allow the user processor unlimited access to data stored in memory or peripheral devices. Attempts at making a personal computer secure have included adding software and using 'custom' secured architectures. Security implemented in software can be circumvented by bypassing or patching the security software. Hardware security devices have been incompatible with standard computer architecture and thus to provide security for standard commercially available computing systems adapted to run off the shelf commercial software is both expensive and undesirable. Even in such cases, single processor systems enforce their own security policy which can easily be bypassed.

SUMMARY OF THE INVENTION

Figure 1:
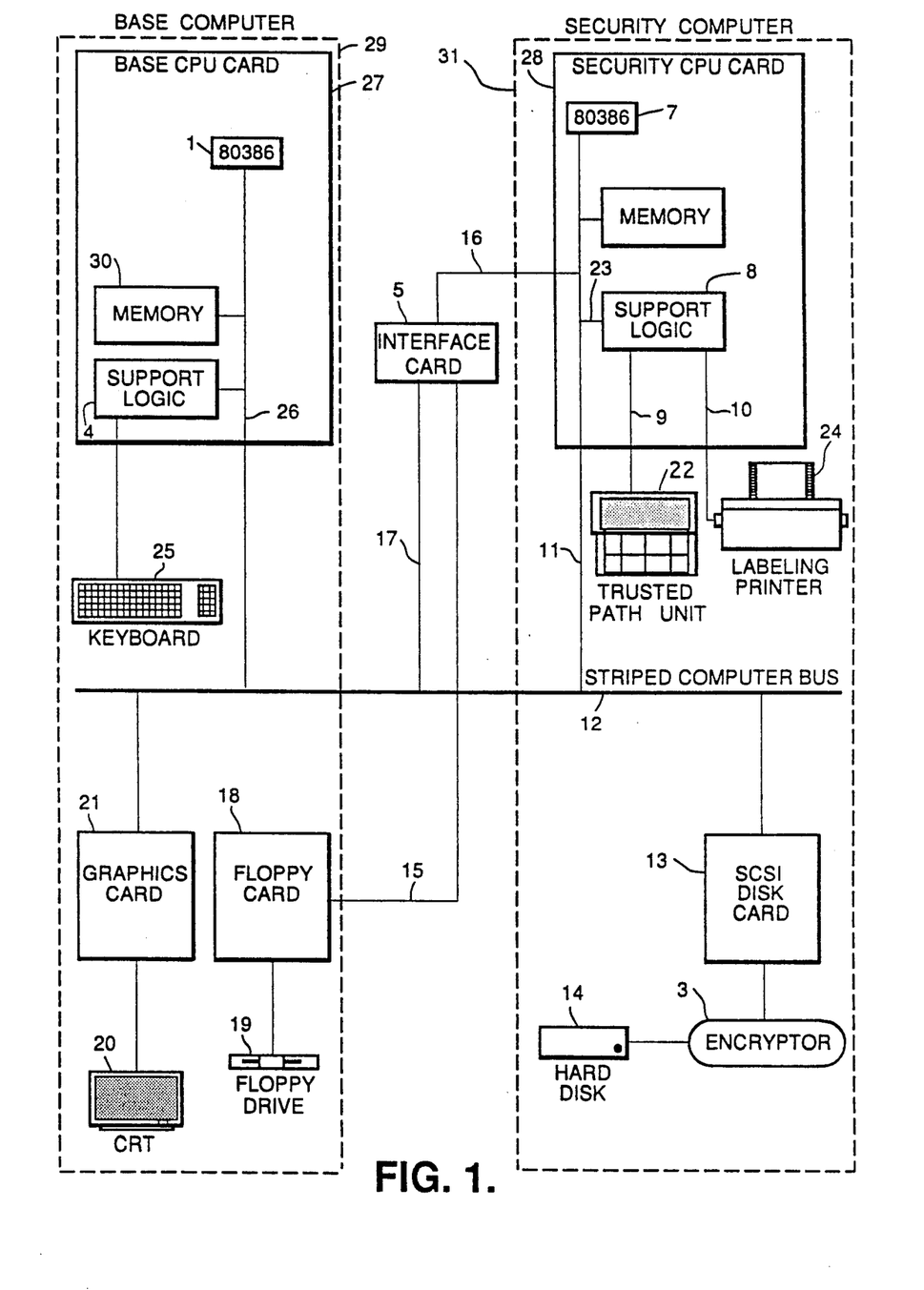
FIG. 1 shows a first embodiment, called the striped bus embodiment, of the security system of this invention in block diagram form.
Figure 2:
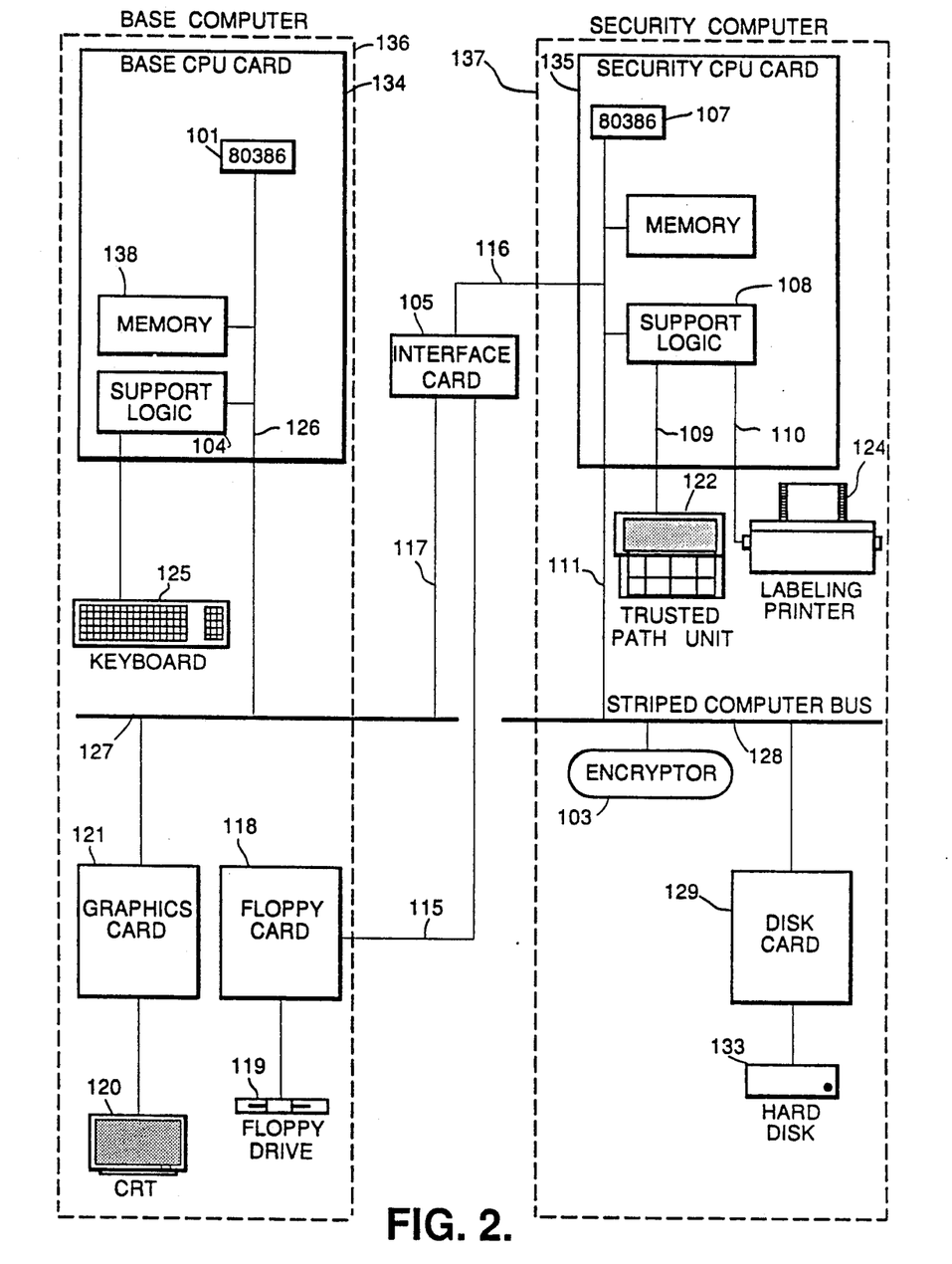
FIG. 2 shows a second embodiment, called the partitioned bus embodiment, of the security system of this invention in block diagram form.

This invention provides a security system which adapts a conventional base computer for high security use by addition of hardware and software. The system hardware includes: (1) security computer means for reading and writing data from memory means in the base computer system, for transferring data to and from encryption means and storage means, and for interfacing with access monitoring means and trusted path interface means; (2) trusted path interface means connected to the security computer means for providing secure user access to the security system; and (3) interface card means, including memory means, for connecting the security computer means to the base computer system for communication between the security computer means and the base computer. Conventional computer architecture grants the user processor unlimited access rights. By utilizing a security CPU to act as a "guard", this system provides the means to make a secure system. FIGS. 1 and 2 show two possible security system embodiments. The highlighted blocks indicate circuitry unique to this invention.

This system restricts access to data in protected storage devices. FIG. 1 shows one embodiment, called the "striped bus embodiment". In this embodiment, the base computer and security computer share a single bus, and access to them is restricted via utilization of means internal to the base computer. FIG. 2 shows a second embodiment, called "the partitioned bus embodiment". In this second embodiment, no storage device is included in the base computer, and therefore access to such storage devices is electrically restricted. In both embodiments, the system maintains security and integrity by insuring that unauthorized users cannot read or write data to storage devices.

The architectural structures of the "striped bus" and "partitioned bus" are similar. The separation of the bus as in FIG. 2 supports alternative encryption requirements. FIG. 1 shows a secure architecture utilizing a small computer system interface (SCSI) controller 13 for the storage media. FIG. 2 shows a similar architecture using an encryption unit 103 and a conventional hard disk controller 129.

The security computers 31 and 137 control the operation of the security system. In preferred embodiments, the security computer is based on the Intel 80386 microprocessor. The security CPU card resides on the security computer bus 128, in the partitioned embodiment, or on the striped base computer bus 12, in the striped embodiment. During operation, the security computer has the ability to read and write data from base computer memory, using direct memory access.

In classified environments, the security computer communicates with the encryption unit. All data transferred between the security computer and the storage device passes through the encryption unit.

In unclassified but sensitive environments, the security computer communicates with the encryption unit through the security computer bus. Sensitive data intended for storage on a hard disk pass through an encryption unit and are stored in a portion of memory reserved for encrypted data.

Encrypted data is then written to the hard disk under the control of the security computer.

The security computer contains direct interfaces to the trusted path units 22 and 122. The trusted path unit provides secure communication from a user to the security computer.

Each trusted path unit comprises means for providing a user access, upon entry of an appropriate identifier, to the security system. In preferred embodiments, the trusted path unit comprises a suitable display and a keypad for entering user identifier information to the security computer means. In such preferred embodiments, the trusted path unit displays a user's classification level during use.

This system has many advantages. User identification and authorization takes place over a trusted path connected directly to the security computer. No data is permitted to pass over the base computer bus unless the base computer is being operated by an identified user with access to the requested data. Users who change or damage the base computer software portions of the security system still have no access to secure data. The security system validates all requests against an identified user even if the request originates from untrusted software.

The software components of the security system include three that operate in the security computer, and two that operate in the base computer. The three components that operate in the security computer are: (a) the executive and utility programs; (b) the security policy enforcing programs; (c) the device control program. The programs that operate with the base computer include the disk operating system interfacing programs and the utility programs.

In secure computer systems, computer memory is treated in different ways based upon the function of its contents. In this context, a "subject" is memory containing an active entity such as a program or device driver. The execution of a program or of a device driver causes information to flow among objects or changes the system state. An "object" is memory containing a passive entity such as a data base or a word processing file. Access to an object by a subject means that the subject's instructions can use and/or change the data in the object. A domain is the unique context in which a program is operating, i.e. the set of objects that a subject can potentially access.

The executive programs isolate the subjects in the security system from the hardware, and provide basic operating system services such as multi-tasking, inter-task communication, memory management, interrupt dispatching and fault handling.

The utility programs create and destroy subjects and objects, maintain a logical structure of files and directories on storage devices in the security system, transform security computer file system constructs into file system constructs that can be used with the base computer, and power-up the security system. The power-up program places the security system into protected virtual address mode, then transfers control to the executive program.

In the preferred embodiments, the security policy enforcing software audits security-relevant activities, maintains an auditable event table, and writes audit blocks to media in the security system. These tables and logs are maintained on storage devices as files. The security policy software also provides Discretionary Access Control functions, Mandatory Access Control functions and type enforcement functions. The security policy enforcing software also provides a labeling printer function to create hard copy output containing proper sensitivity labeling; a trusted path function to interact with the user for performing trusted path operations such as log-in and log-out; and session manager functions providing control over a user session. The security system device control software controls the base computer interface, the trusted path interface, the printer interface, the disk interface, and the encrypter interface.

The base computer interfacing software modifies standard basic input/output services by translating them into requests to the security system for required services. The base computer installable device drivers are utilized to present an MS-DOS compatible interface to devices controlled by the security system including a port drive, hard disk and floppy drivers, and printer.

The base computer utility programs are those normally supplied by MS-DOS that require modification to operate correctly with the security system including the system configuration commands used to load device drivers, system configuration commands used to load a command line interpreter, commands used to set or show date and time, and commands used to list directory entries.

BRIEF DESCRIPTION OF THE DRAWINGS

This invention can be better understood by reference to the drawings, in which.

DETAILED DESCRIPTION OF THE PREFERRED EMBODIMENTS

Referring to FIG. 1, base computer 29 is an AT-type personal computer (PC) utilizing a single card as its base CPU card 27 containing a 80386 CPU chip 1, and RAM memory 30 with conventional support logic 4.

Typical support circuitry may include ROM, clock circuitry and general processor support logic. A keyboard 25 is also included in base computer 29.

FIG. 1 also shows the common striped computer bus 12 connected to both the security CPU card 28 and the base CPU card 27. Security computer CPU chip 7 is linked, through support logic block 8, on serial path 9 to the trusted path interface unit 22. Security computer CPU chip 7 is also linked, via path 11, support logic 8 and path 10 to printer 24, which applies appropriate security labeling to any printed output from the system.

Security CPU card 28 directs commands to encryption unit 3 via path 11, bus 12, and SCSI card 13 to encrypt, as necessary, any data desired to be encrypted, before storage of such data, under command of security CPU card 28, on hard disk 14.

Interface card 5 links security computer 31 and base computer 29 via paths 16 and 17. Through interface card 5 and path 15, security computer 31 can override control of floppy drive 19 by floppy controller 18 to enforce specified security restrictions on any user.

FIG. 2 shows the partitioned bus embodiment of this system. Security computer CPU chip 107 is linked via path 111 to support logic 108. In turn, support logic 108 is linked via serial path 109 to trusted path unit 122. Support logic 108 is linked via path 110 to printer 124. Support logic 104 links base computer CPU chip 101 to keyboard 125. Interface Card 105 is connected to security computer 137 via path 116 and to base computer 136 via path 117.

The principal difference between this embodiment and the embodiment shown in FIG. 1 is that this embodiment has two separate buses, base computer bus 127 and security computer bus 128.

The interface card 5/105 also includes non-volatile RAM provided for storage or configuration of key information. Static RAM devices implement physical memory.

Control registers in the interface card 5/105 provide for storage of status and control words used to control the functions of the interface card 5/105, and regulate communication between the security computer and the base computer.

A floppy disk controller card 18/118 resides in the base computer 29/136 and is treated as a red peripheral device. A red device operates on data in unencrypted form; a black device operates on data in encrypted form. To maintain control of the drive 19/119, a cable routing signals from the floppy drive 19/119 and the floppy controller card 18/118 is connected to the interface card 5/105 to gain access and write-protect control of the floppy drive 19/119. The floppy controller card 18/118 need not be modified for this application. The security computer 31/137 controls floppy disk access through modification of the control signals contained in the interface carried on the cable 15/115.

The security computer 31/137 performs all processing related to security. The security CPU card 28/135 includes a security computer processor 87/107, controller chips, buffer/registers, and memory. All other devices in the security system are controlled by the security computer 31/137.

The security CPU card 38/135 uses an Intel 80386 7/137, operating in protected virtual address mode. This security CPU card 28/135 includes two types of memory: programmable read only memory (PROM) and working RAM. The PROM contains the software for the security system. The working RAM contains data tables and cached disk blocks.

The security CPU card 28/135 can act as a bus master on the base computer bus 12/127 through the interface card 5/105. Thus, the security computer 31/137 can read and write data from the base computer 29 using either direct memory accesses, or direct memory access controller. The security CPU card 28/135 includes two RS-232 compatible serial ports, one for the trusted path unit 9/109 connection, the other for connection to a serial printer 24/124 or diagnostic device.

The security computer 31/137 can also access any I/O device or memory space available to the base computer 29/136. To facilitate this operation, the base computer input/output map and memory map are configured as subsets of the security computer input/output map and memory map. The security computer maps are modeled after personal computer AT maps, but configured to include the base computer maps and to take advantage of the expanded addressing capabilities of the security computer.

The security CPU card 28/135 memory map includes space allocated to working RAM, and memory replicating the memory map of the base computer.

Figure 5:
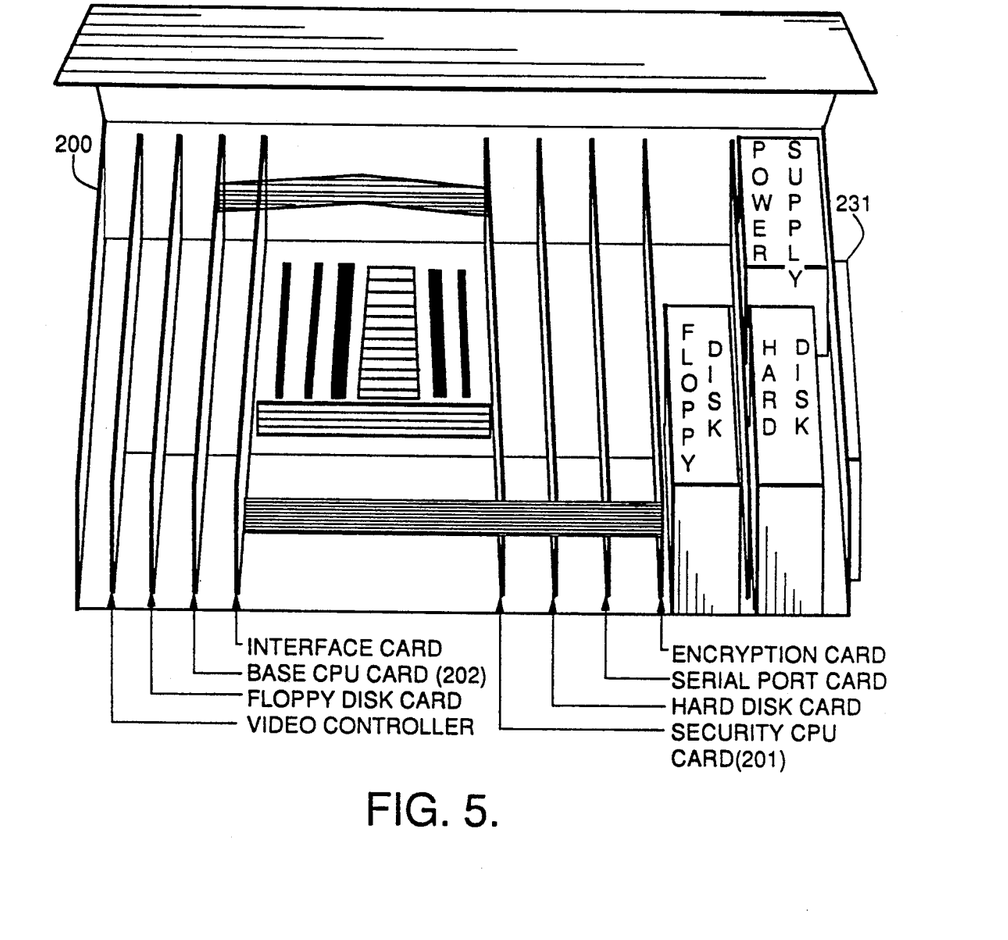
FIG. 5 shows the mechanical configuration of the partitioned bus embodiment (see FIG. 1), including a plug-in card encryption unit; the mechanical configuration of the striped bus embodiment is the same except that the bus break is not needed.

FIG. 5 shows the mechanical configuration of the security system of this invention. The security CPU card 201 is housed within unit 200, which includes the trusted path interface keypad 231, and is linked electrically to the monitor and keyboard of the base CPU card 202. Preferably, the trusted path unit 232 is mechanically integrated with the cabinet 230 for the security system components, and is mounted so that the user can easily observe the display and enter data on the keypad.

The security system utilizes software in both the base computer and security computer in a client/server relationship. The base computer software makes requests of the security computer software. The security computer software then services these requests and conveys the results to the base computer. From the base computer standpoint, the security system functions like a disk device subsystem, in that requests are made, time passes, and data is returned without additional base computer action.

The software in the security system enforces Mandatory Access Control and Discretionary Access Control policies, including object and subject sensitivity labeling, human readable output labeling, user identification, authentication, and auditing functions.

The base computer can, in preferred embodiments, use MS-DOS, O/S 2 or UNIX operating systems. Conventional operation system functions are presented with a security-emulated operating system compatible file system. In preferred embodiments, other utility programs for managing and displaying the security systems object attributes maintained by the security system are provided.

The software in the security computer includes three components, namely the executive and utility software, the security policy enforcing software, and the device control routines software.

The base computer software outside the security system includes operating system interface programs, utility programs, and user operating systems and applications.

Figure 3:
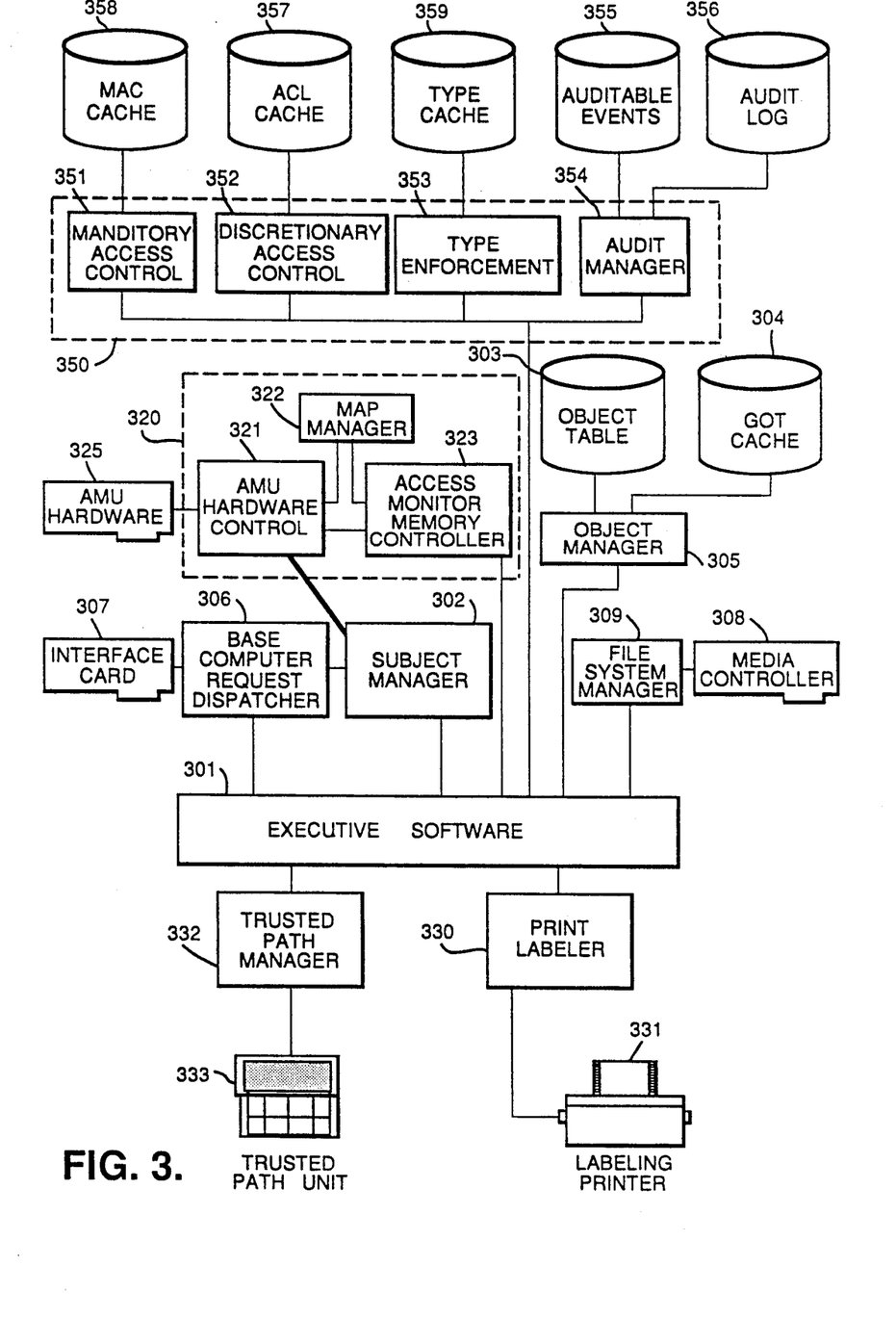
FIG. 3 shows a block diagram of the software components for a preferred embodiment of the security computer system of this invention.

FIG. 3 shows an overview of the security computer software components. The executive software 301 provides a platform upon which the subjects of the system can execute. The executive software 301 isolates the security system subjects from the hardware, and provides basic operating system services such as multi-tasking, intertask communication, memory management, interrupt dispatching, and fault handling.

The security system utility subjects are responsible for performing non-security policy enforcing functions. For example, a subject manager 302 is responsible for creating and destroying security system subjects. During start-up, the subject manager 302 gains control from the executive software 301 after power-up is complete. The subject manager 302 creates each required security system subject. The object manager 305 is responsible for creation and destruction of security system objects. An object is an area of storage in the security system. Each is either a file system object or a memory object. File system objects are stored on suitable media and are made available by the file system manager 309. Memory objects are maintained in the security computer system memory.

Objects are uniquely identified. The identifiers used to locate the object are global object table 303 (GOT) entries, which contains the access information for the object. For file system objects, the GOT is stored on suitable media, with a cache 304 of such entries kept in security computer memory by the object manager 305. For memory objects, GOT entries are created dynamically and placed in the GOT cache by the object manager 305. The entries are not removed from the cache during the lifetime of the object, since memory object GOT entries have no disk-resident counterpart.

When an existing object is referenced, the security enforcing functions 350 use the GOT access information to determine what access to grant. When a new object is created, this access information defaults so that the creating subject has full access, and other subjects have no access. When an object is destroyed, its contents and associated GOT entry 303 are overridden to preclude reuse by a subsequent object creation. The object manager 305 is invoked by the base computer request dispatcher 306 when the base subject performs operations to the interface card 307/5/105.

The file system manager 309 is responsible for maintaining a logical structure of files and directories on security system storage devices via controller 308. The file system manager 309 provides services for creating, opening, closing, extending, and deleting files or directories. For compatibility reasons, the semantics of the file system parallel those found in the MS-DOS file system.

The file system manger 309 transforms security file system constructs into MS-DOS file system constructs. In this way, it supports base subjects that recognize what MS-DOS disk structures look like, and expect to read and write them, using low-level basic input/output system and DOS disk functions. The emulated structures are the boot block, file allocation table, root directory area, and subdirectory areas The security file system manager 309 responds to base subject requests for input/output using an area of the disk that would contain an emulated structure if the storage device were actually an operating system disk For disk read requests, the requested operating system data structure is built dynamically, based on information in the security file system via controller 308, and returned to the base subject For write requests, the contents of the operating system data structure are converted into equivalent security file system constructs.

A major advantage of emulating file systems is that the disk utility programs will work correctly on the security system. These programs are useful for searching and organizing files, and file system emulation prevents them from presenting a security problem because these programs operate only on files on which the user has some access. Further, these utilities are funneled through the security system, where complete security checks on every disk operation are performed.

The security policy enforcing software includes several functions. The audit function 354, for example, provides a single point for auditing security-relevant actions, and maintains an auditable event table 355 and writes audit blocks 356 to suitable media. The auditable event table 355 and audit log 356 are kept on the storage devices as files. These files 355/356 are written automatically so that a write to the audit log 356 always performs a device output.

The Discretionary Access Control function 352 provides a single point for determining access rights based on access control lists. This function 352 maintains a cache 357 of access control list (ACL) data for the most recently used objects. When it receives a request for Discretionary Access Control rights of a subject to an object not in the Discretionary Access Control, function 352 gets the data out of the GOT data base 303 from the object manager 305 via the executive 301.

The Mandatory Access Control function 351 provides a single point for determining access rights based on security levels, and maintains a cache 358 of security level data for the most recently used objects. When MAC 351 receives a request for the rights of a subject to an object not in the cache, the function 351 gets the data out of the GOT data base 303 from the object manager 305 via the executive 301.

The type enforcement function 353 provides a single point for determining access rights based on domains and types, and maintains a cache 359 of type data for the most recently used objects. When this function 353 receives requests for type enforcement rights of a subject to an object not in the cache, the type enforcement function gets the data out of the GOT data base 303 from the object manager 305 via the executive 301.

The labeling printer function 330 creates proper sensitivity labeling for hard copy output produced on the printer 331.

The trusted path function 332 is used to interact with a user for performing trusted path keypad 333 operations such as log-in and log-out. When a user requests log-in, the trusted path function 332 performs user identification and authentication.

Figure 4:
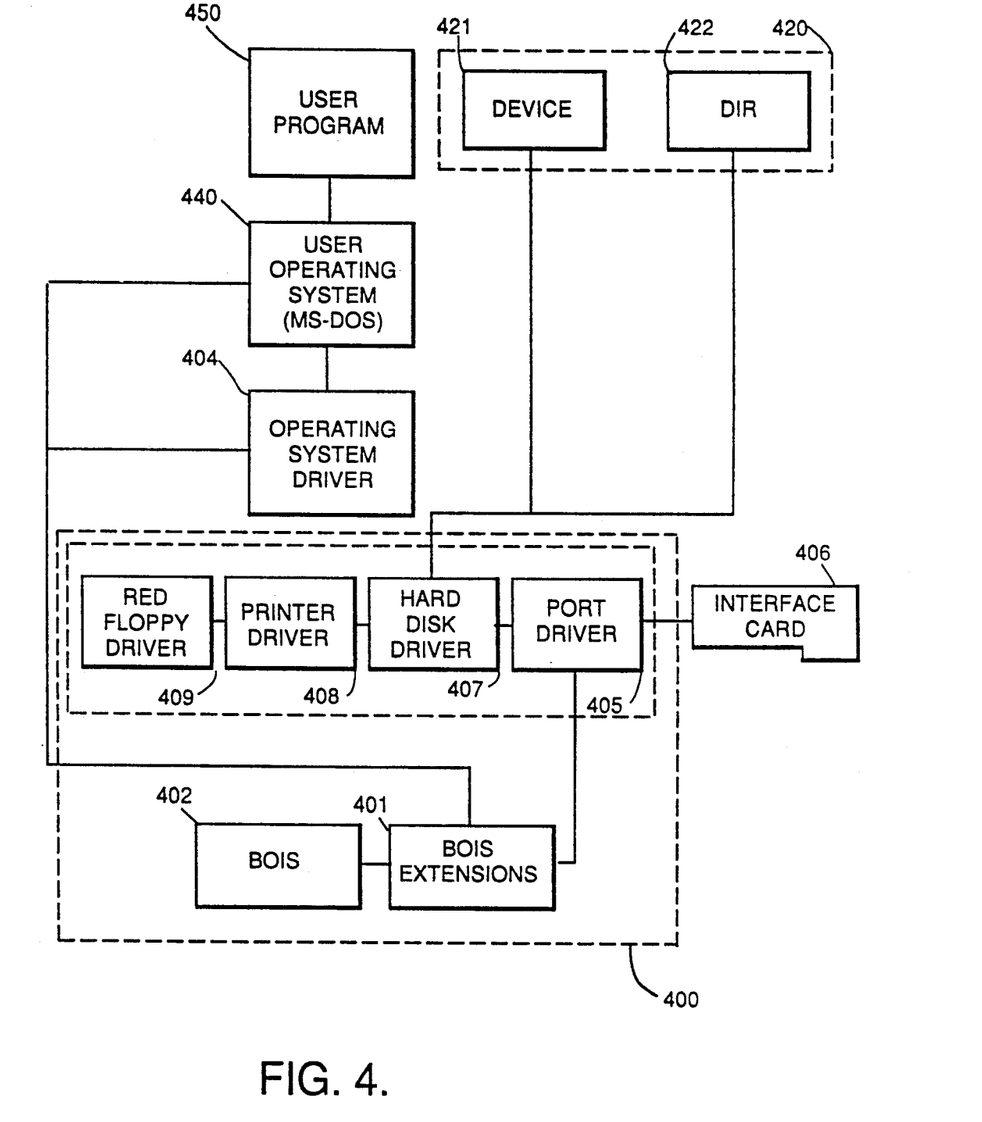
FIG. 4 shows a block diagram of the software components for a preferred embodiment of a base computer system with which the security computer system of this invention can be used.

FIG. 4 shows an overview of the base computer software components. The operating system interface software 400 provides the base computer with access to security system services in a manner transparent to user programs 450 operating on the base computer. This interface is provided at the basic input/output service and at the device driver level, and insures that user programs 450 can operate in this security system without modification.

The base computer operating system interface software 400 includes six functions. The base computer BIOS (basic input/output system) extensions 401 modify the standard BIOS 402 such that base computer calls to BIOS functions are translated into requests to the security system for the required service. In the preferred embodiments, the BIOS 402 used for the system is based on the standard portable BIOS provided by Microsoft under license. Extensions to this BIOS 401 are primarily in the boot-up and storage device access routines. The BIOS routines 401/402 are used by both operating system 440 and application programs 450 used on the base computer.

The base computer installable device drivers 403 are used to present an operating system compatible interface to devices actually controlled by the security system. There are several such devices. The port driver 405 is the only base computer software that interacts directly with the security system. The port driver 405 passes service requests from the base software 440 or 401 to the security system computer via the dual-port mailbox memory 406 provided in the base to security system interface card 5/ 105. When the request completes, status is returned by the port driver 405 to the requesting program 440 or 401. The port driver 405 provides a single consistent interface to the security system for use by the BIOS extensions 401 and other installable device drives 403.

Hard disk drivers 407 provide the standard disk drive devices used by base computer programs 440/450. These device drivers present the operating system with the expected disk device interface used by MS-DOS. These drivers 407 translate all disk I/0 requests from the base computer into security system service requests. These requests are passed to the security system via the port device driver 405.

The red floppy disk driver 409 provides access to a disk device directly connected to the base computer. Data written to this floppy device is not encrypted. This device driver 409 operates identically to any standard floppy disk driver 409, except that the disk input/output request is passed to the security system for validation and auditing. If the security system determines that the request is allowable, the red floppy driver 409 will enable the red floppy disk-write circuit.

The printer driver 408 provides the base computer with a standard printer device interface. Data sent to this printer device is passed to the security system for printing. The security system printer 330 adds sensitivity labels to the data before printing the data.

The base computer utility programs 420 are those normally supplied with the operating system that requires changes to operate correctly with the security system. For example, a utility such as DIR 422 is used to list directory entries. The security system version of the DIR 422 command might list file access control lists and current Mandatory Access Control labels in addition to its normal functions.

What is claimed is:

1. A security system for enabling an unsecured base computer to process sensitive data for security use when running nonsecurity use software, said security system comprising:
    a base computer, said base computer having a processor and a memory for processing non-security use software and sensitive data for security use;
    a security computer;
    interface means coupled between the base computer and the security computer for communicating sensitive data for security use from the base computer to the security computer; and
    trusted path interface means coupled to the security computer for providing user access data to the security computer;
    said security computer comprising:
        means for processing sensitive data for security use and user secure access data to generate security control data;
        means for generating encrypted data; and
        means for communicating encrypted data and security control data to the base computer via the interface means.

2. The security system of claim 1 wherein said means for providing user access data comprises a trusted path unit coupled to said security computer for controlling access to the base computer.

3. The security system of claim 2 wherein the security control data includes at least one of the following sets of data for each sensitive datum: data specifying a user, an access level for the user, and a security level for the user.

4. The security system of claim 1, wherein said security computer provides security control data to regulate, interrupt, and delay operation of the base computer.

5. A computing system comprising:
    an unsecured base computer;
    a security computer;
    interface means coupled between the base computer and the security computer for communicating sensitive data for security use between the base computer and the security computer;
    trusted path interface means coupled to the security computer for providing user access data to the security computer;
    wherein the base computer includes a processor and a memory for processing non-security use software and sensitive data for security use;
    wherein the security computer includes means for processing sensitive data for security use and user access data to generate security control data for enabling said base computer to process sensitive data for security use when running non-security use software.

6. The computer system of claim 5 said security computer further comprising means for encrypting data.

* * * * *